(12) United States Patent
Yamazaki et al.

(10) Patent No.: US 7,356,251 B2
(45) Date of Patent: Apr. 8, 2008

(54) ASSEMBLY-STAGE FOCUS ADJUSTMENT MECHANISM OF A ZOOM LENS

(75) Inventors: Yoshihiro Yamazaki, Saitama (JP); Yuji Kogure, Saitama (JP); Kazunori Ishizuka, Kanagawa (JP); Toshiharu Suzuki, Saitama (JP)

(73) Assignee: PENTAX Corporation, Tokyo (JP)

( * ) Notice: Subject to any disclaimer, the term of this patent is extended or adjusted under 35 U.S.C. 154(b) by 381 days.

(21) Appl. No.: 11/198,220

(22) Filed: Aug. 8, 2005

(65) Prior Publication Data
US 2006/0034596 A1  Feb. 16, 2006

(30) Foreign Application Priority Data
Aug. 13, 2004 (JP) .............................. 2004-235738

(51) Int. Cl.
*G03B 17/00* (2006.01)
(52) U.S. Cl. .................. 396/79; 396/72; 359/676; 359/687; 359/694; 359/700; 359/701
(58) Field of Classification Search .............. 396/72, 396/79; 359/676, 687, 694, 700, 701
See application file for complete search history.

(56) References Cited

U.S. PATENT DOCUMENTS

| 5,349,475 | A | 9/1994 | Nomura et al. |
| 5,774,282 | A | 6/1998 | Kohmoto et al. |
| 6,026,244 | A | 2/2000 | Tanaka |
| 6,456,792 | B2 * | 9/2002 | Tanioka .................. 396/79 |
| 6,813,441 | B2 | 11/2004 | Yamazaki |
| 2004/0160678 | A1 * | 8/2004 | Nomura et al. ............ 359/701 |
| 2006/0098303 | A1 * | 5/2006 | Sato ........................ 359/700 |

FOREIGN PATENT DOCUMENTS

JP  9-49961  2/1997

OTHER PUBLICATIONS

English language Abstract of JP-49961.

* cited by examiner

*Primary Examiner*—W. B. Perkey
*Assistant Examiner*—Warren K Fenwick
(74) *Attorney, Agent, or Firm*—Greenblum & Bernstein, P.L.C.

(57) ABSTRACT

An assembly-stage focus adjustment mechanism of a zoom lens barrel including a plurality of lens groups which are moved while distances therebetween are changed to perform a zooming operation, the assembly-stage focus adjustment mechanism including two lens fixing frames to which two of the plurality of lens groups are fixed, respectively; two moving frames which linearly move in an optical axis direction during the zooming operation, the two moving frames being respectively screw-engaged with the two lens fixing frames; and a rotational-direction integrating device which makes the two lens fixing frames rotate as one integral body in a direction of rotation relative to the two moving frames when an assembly-stage focus adjustment operation is performed.

11 Claims, 6 Drawing Sheets

ASSEMBLY-STAGE FOCUS ADJUSTMENT MECHANISM OF A ZOOM LENS

BACKGROUND OF THE INVENTION

1. Field of the Invention

The present invention relates to a focus adjustment mechanism for adjusting the focal point at both the short and long focal length extremities when the zoom lens is assembled.

2. Description of the Related Art

At the assembly stage of a zoom lens (zoom lens barrel), the position of a specific lens group (assembly-stage focus-adjusting lens group) relative to another lens group is mechanically adjusted so that the focal point does not change during a zooming operation (i.e., so that the focal point at the long focal length extremity and the focal point at the short focal length extremity are coincident with each other). This adjusting operation is hereinafter referred to as an "assembly-stage focus adjustment operation".

However, depending on the distribution of optical power, the amount of movement of the assembly-stage focus-adjusting lens group in order to carry out adjustment becomes large in the assembly-stage focus adjustment operation, which sometimes becomes an obstacle to miniaturization of the zoom lens.

SUMMARY OF THE INVENTION

The present invention provides an assembly-stage focus adjustment mechanism which is constructed to prevent the amount of movement of the assembly-stage focus-adjusting lens group during the assembly-stage focus adjustment operation from becoming large.

The present invention has been devised from the viewpoint that the amount of movement of the assembly-stage focus-adjusting lens group during the assembly-stage focus adjustment operation can be minimized if two lens groups of the zoom lens system are moved simultaneously in the optical axis direction.

According to the present invention, an assembly-stage focus adjustment mechanism of a zoom lens barrel is provided, including a plurality of lens groups which are moved while distances therebetween are changed to perform a zooming operation, the assembly-stage focus adjustment mechanism including two lens fixing frames to which two of the plurality of lens groups are fixed, respectively; two moving frames which linearly move in an optical axis direction during the zooming operation, the two moving frames being respectively screw-engaged with the two lens fixing frames; and a rotational-direction integrating device which makes the two lens fixing frames rotate as one integral body in a direction of rotation relative to the two moving frames when an assembly-stage focus adjustment operation is performed.

It is desirable for the plurality of lens groups to include a first lens group, a second lens group, a third lens group and a fourth lens group which are arranged in that order from an object side, the first lens group and the second lens group constituting the two lens groups.

It is desirable for the rotational-direction integrating device to include a cam device for bringing the two moving frames to approach each other outside a zooming range; and a coupling device for mechanically coupling the two fixing frames to each other in the direction of rotation when the two moving frames are moved to respective positions thereof close to each other.

It is desirable for the rotational-direction integrating device to include a jig which mechanically connects the two lens fixing frames to each other in the rotational direction.

It is desirable for the two lens fixing frames to be mechanically connected to each other by the jig when the zoom lens barrel is set at wide-angle extremity.

It is desirable for the two lens fixing frames to be screw-engaged with the two moving frames with the same thread leads, respectively.

It is desirable for focus sensitivities of the two lens groups to have the same sign.

It is desirable for the cam device to include outer cam grooves and inner cam grooves which are formed on an outer peripheral surface and an inner peripheral surface of a cam ring, respectively.

It is desirable for the jig to be accessible to the two lens fixing frames from a front end of the zoom lens barrel.

It is desirable for the coupling device to include a plurality of projecting portions and a plurality of recessed portions which are respectively formed on surfaces of the two lens fixing frames that are opposed to each other in the optical axis direction.

In an embodiment, a zoom lens barrel is provided, including at least three movable lens groups which are moved along an optical axis to perform a zooming operation, the zoom lens barrel including two lens holders to which two of the three movable lens groups are fixed, respectively; two moving frames which linearly move in an optical axis direction without rotating during the zooming operation, the two moving frames being respectively screw-engaged with the two lens holders; and a rotational-direction integrating device which makes the two lens holders rotate as one integral body in a direction of rotation relative to the two moving frames when an assembly-stage focus adjustment operation is performed.

According to the present invention, since two lens groups are rotated as the assembly-stage focus-adjusting lens group, the amount of movement of the assembly-stage focus-adjusting lens group can be minimized, which contributes to miniaturization of the zoom lens.

The present disclosure relates to subject matter contained in Japanese Patent Application No. 2004-235738 (filed on Aug. 13, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
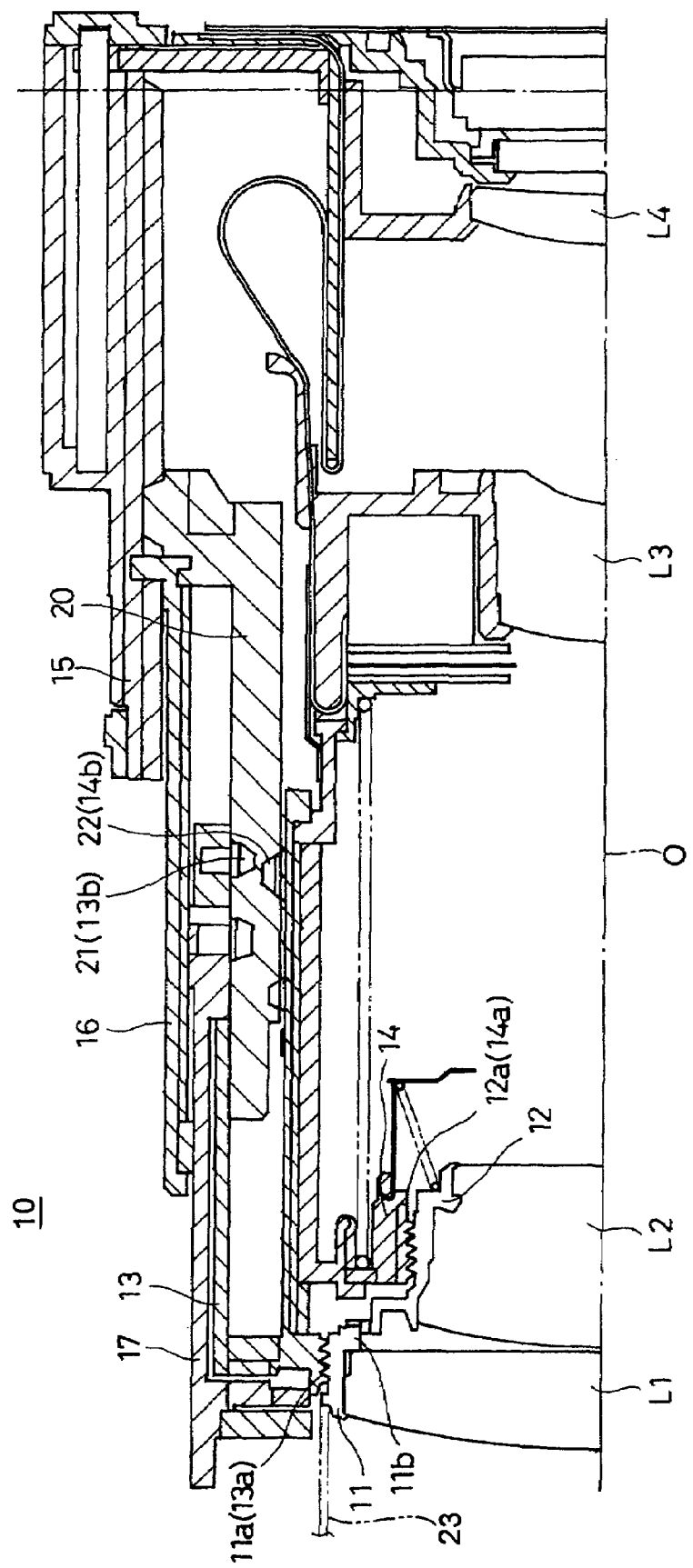
FIG. 1 is a longitudinal cross sectional view of a zoom lens barrel in which a first embodiment of an assembly-stage focus adjustment mechanism devised according to the present invention is incorporated, showing an upper half of the zoom lens barrel from the optical axis thereof in a state where the first lens group and the second lens group are positioned at their respective positions close to each other outside of the zooming range to allow an assembly-stage focus-adjusting operation to be performed.
Figure 2:
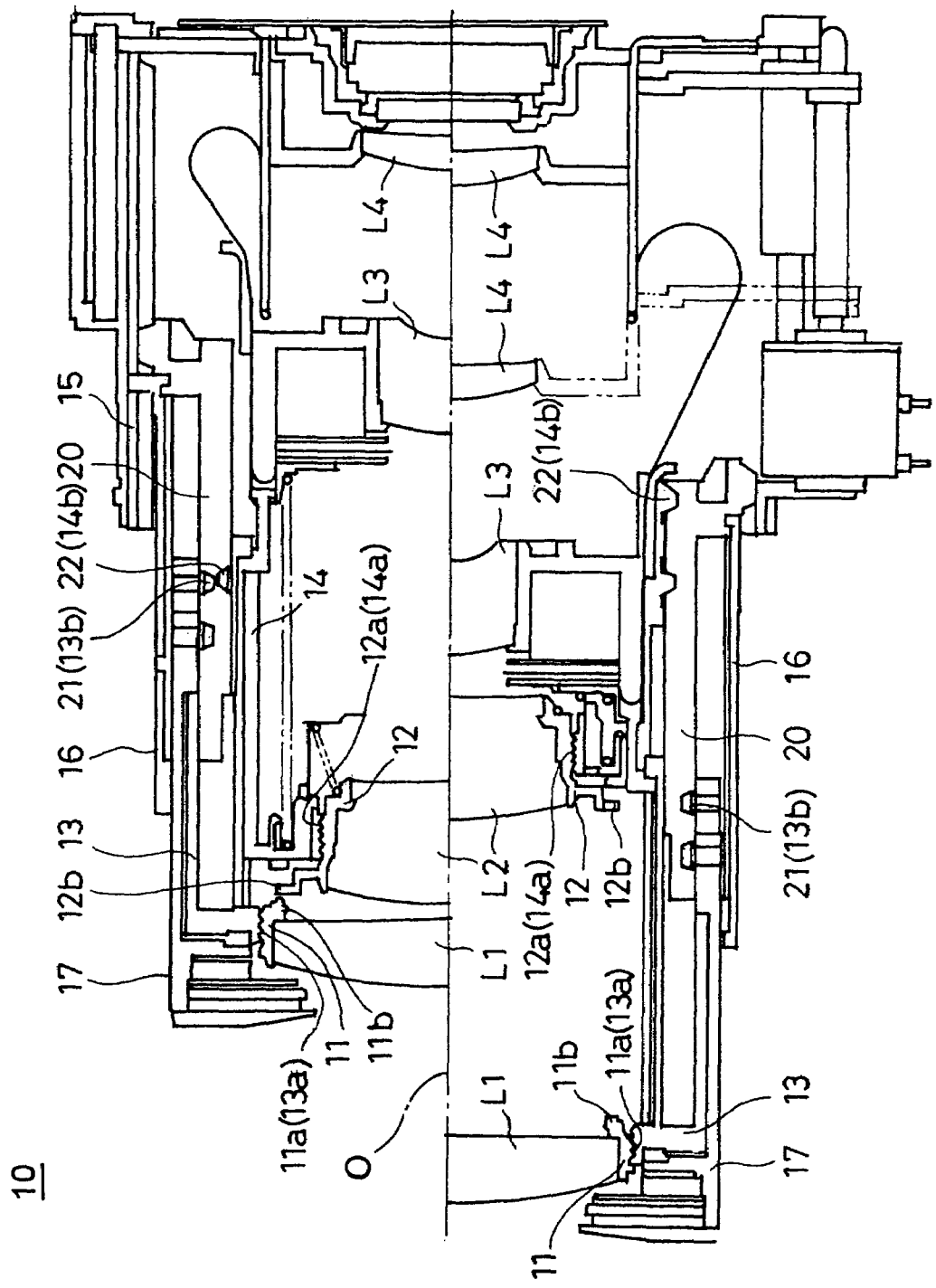
FIG. 2 is a longitudinal cross sectional view of the zoom lens barrel shown in FIG. 1, showing an upper half and a lower half of the zoom lens barrel from the optical axis thereof at the wide-angle extremity and the telephoto extremity, respectively.
Figure 3:
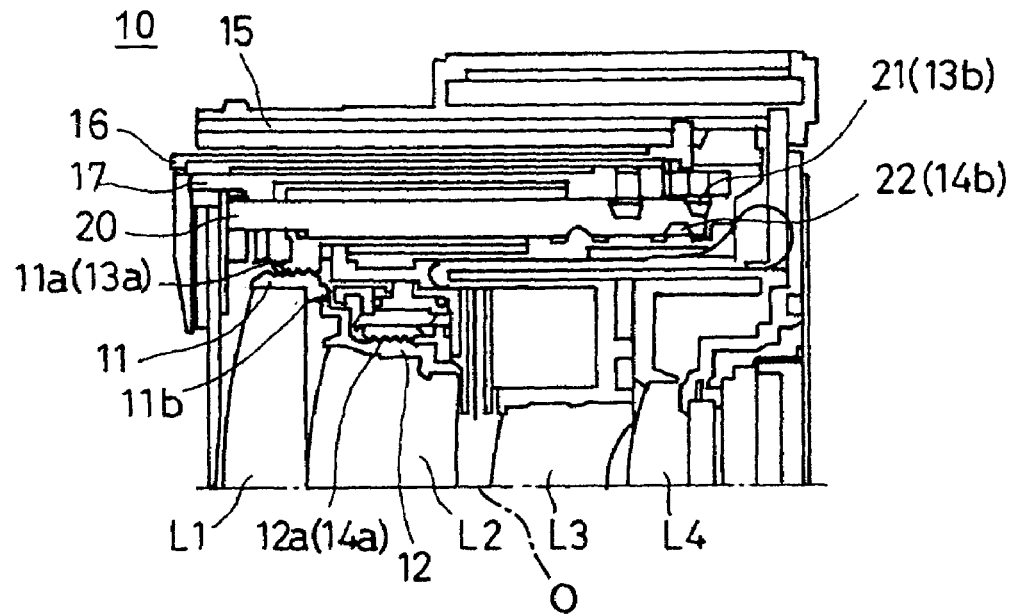
FIG. 3 is a longitudinal cross sectional view of the zoom lens barrel shown in FIG. 1, showing an upper half of the zoom lens barrel from the optical axis thereof in a retracted state.

FIGS. 1 through 5 show a zoom lens barrel in which a first embodiment of an assembly-stage focus adjustment mechanism devised according to the present invention is incorporated. A zoom lens optical system of the zoom lens barrel 10 consists of four lens groups: a positive first lens group L1, a negative second lens group L2, a positive third lens group L3 and a positive fourth lens group L4, in that order from the object side (left side as viewed in FIG. 1). The focus sensitivities of the first lens group L1 and the second lens group L2 have the same sign (i.e., positive or negative). The first through fourth lens groups L1, L2, L3 and L4 are moved along an optical axis O while their respective distances therebetween are changed to perform a zooming operation. In the present invention, a specific manner of moving the first through fourth lens groups L1 through L4 to perform a zooming operation and a mechanism therefor are optional. In FIG. 2, an upper half of the zoom lens barrel 10 from the optical axis 10 shows a state of the zoom lens barrel 10 at the wide-angle extremity, while a lower half of the zoom lens barrel 10 shows a state of the zoom lens barrel 10 at the telephoto extremity. FIG. 3 shows the zoom lens barrel 10 in a retracted state.

In the present embodiment of the zoom lens barrel 10, the first lens group L1 and the second lens group L2 serve as the aforementioned assembly-stage focus-adjusting lens group, the position of which in the optical axis direction is adjusted at the assembly stage so that the focal point does not change during a zooming operation. The first lens group L1 and the second lens group L2 are fixed to a first lens group fixing frame (lens holder) 11 and a second lens group fixing frame (lens holder) 12, respectively. Each of the first lens group fixing frame 11 and the second lens group fixing frame 12 is in the shape of a cylinder. The first lens group fixing frame 11 is provided on an outer peripheral surface thereof with a male thread 11a, and the second lens group fixing frame 12 is provided on an outer peripheral surface thereof with a male thread 12a. The thread leads of the male thread 11a and the male thread 12a are the same.

The zoom lens barrel 10 is provided with a first lens group moving frame 13 and a second lens group moving frame 14 into which the first lens group fixing frame 11 and the second lens group fixing frame 12 are screwed, respectively. More specifically, the first lens group moving frame 13 and the second lens group moving frame 14 are provided on inner peripheral surfaces thereof with a female thread 13a and a female thread 14a which are screw-engaged with the male thread 11a of the first lens group fixing frame 11 and the male thread 12a of the second lens group fixing frame 12, respectively. The zoom lens barrel 10 is provided with a stationary frame member 15 and a first linear guide ring 16 which is linearly guided in the optical axis direction by the stationary frame member 15. The first lens group moving frame 13 is linearly guided in the optical axis direction only via the first linear guide ring 16, and a second linear guide ring 17 is linearly guided in the optical axis direction via the first lens group moving frame 13, and the second lens group moving frame 14 is linearly guided in the optical axis direction by the first lens group moving frame 13.

Figure 5:
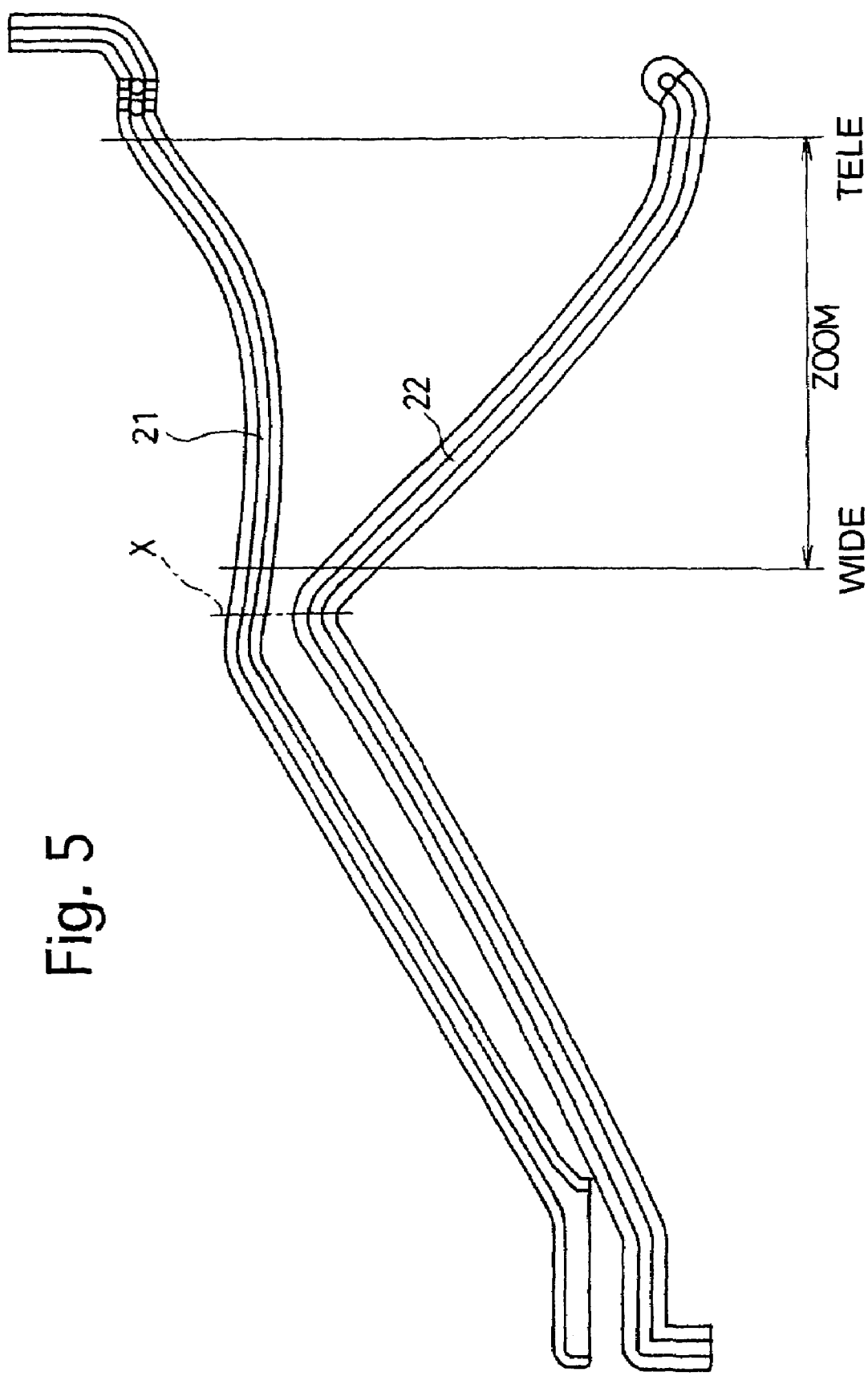
FIG. 5 is a developed view of an outer cam groove and an inner cam groove which are formed on an outer peripheral surface and an inner peripheral surface of a cam ring, respectively.

The zoom lens barrel 10 is provided with a cam ring 20 which is driven to rotate forward and reverse about the optical axis O. The cam ring 20 is provided on an outer peripheral surface thereof with two outer cam grooves 21 for moving the first lens group moving frame 13 (the first lens group L1), and is further provided on an inner peripheral surface of the cam ring 20 with two inner cam grooves 22 for moving the second lens group moving frame 14 (the second lens group L2). The two outer cam grooves 21 are arranged at intervals of 180 degrees, and the two inner cam grooves 22 are arranged at intervals of 180 degrees. FIG. 5 shows one of the two outer cam grooves 21 and associated one of the two inner cam grooves 22. The first lens group moving frame 13 is provided on an inner peripheral surface thereof with two cam followers 13b which are engaged in the two outer cam grooves 21, respectively, and the second lens group moving frame 14 is provided on an outer peripheral surface thereof with two cam followers 14b which are engaged in the two inner cam grooves 22, respectively. Accordingly, forward and reverse rotations of the cam ring 20 cause the first lens group moving frame 13 (the first lens group L1) to move forward and rearward along the optical axis O in accordance with the first linear guide ring 16 and the cam ring 20, and at the same time cause the second lens group moving frame 14 (the second lens group L2) to move forward and rearward along the optical axis O in accordance with the first lens group moving frame 13 and the cam ring 20. Although the third lens group L3 and the fourth lens group L4 are also moved forward and rearward along the optical axis O while the first lens group L1 and the second lens group L2 are moved forward and rearward along the optical axis O to perform a zooming operation, the movements of the third lens group L3 and the fourth lens group L4 have no relationship with the objective of the present invention, and accordingly, a description on the structure driving the third lens group L3 and the fourth lens group L4 is omitted from the following description.

The two outer cam grooves 21 and the two inner cam grooves 22 have a zooming range (ZOOM) having wide-angle extremity (WIDE) and telephoto extremity (TELE) at opposite ends of the zooming range, respectively (see FIG. 5). The first lens group fixing frame 11 (the first lens group L1) and the second lens group fixing frame 12 (the second lens group L2) do not come in contact with each other as long as the two cam followers 13b of the first lens group moving frame 13 and the two cam followers 14b of the second lens group moving frame 14 are positioned within the zooming range.

Figure 4:
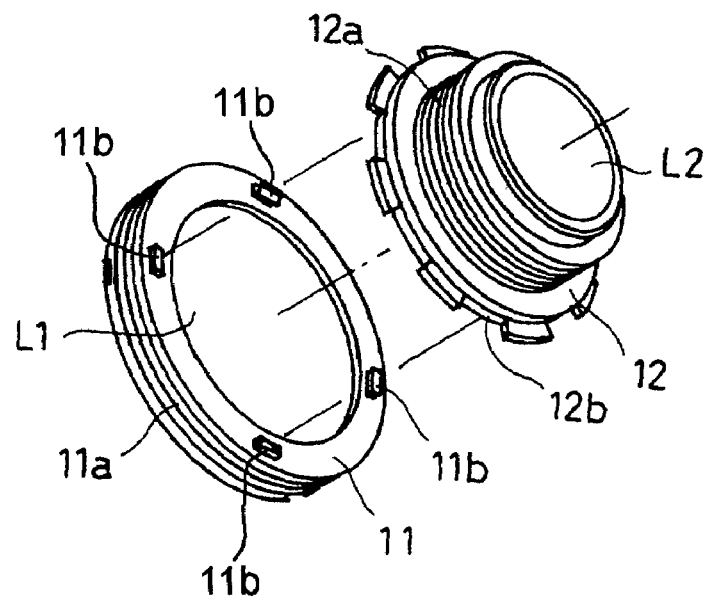
FIG. 4 is an exploded perspective view of a portion of the zoom lens barrel shown in FIG. 1, showing a first lens group fixing frame and a second lens group fixing frame.

On the other hand, the two outer cam grooves 21 and the two inner cam grooves 22 are formed to have an assembly-stage focus adjustment position X (see FIG. 5) outside of the zooming range at which one outer cam groove 21 and the associated inner cam groove 22 are positioned closer to each other than those in the zooming range. As can be clearly seen in FIGS. 1, 2 and 4, the first lens group fixing frame 11 and the second lens group fixing frame 12 are provided, on surfaces thereof opposed to each other in the optical axis direction, with a plurality of projecting portions 11b and a plurality of recessed portions 12b (see FIG. 4), respectively, which are engaged with each other when each cam follower 13b and the associated cam follower 14b move to the assembly-stage focus adjustment position X (see FIG. 5). Specifically, as shown in FIG. 4, the plurality of projecting portions 11b consist of four projecting portions 11b arranged at regular intervals (intervals of 90 degrees) about the optical axis O, while the plurality of recessed portions 12b consist of eight recessed portions 12b (some of them do not appear in FIG. 4) arranged at regular intervals (intervals of 40 degrees) about the optical axis O. Additionally, each projecting portion 11b is smaller in circumferential width about the optical axis O than each recessed portion 12b. In a state shown in FIG. 1 in which the projecting portions 11b are engaged with the plurality of recessed portions 12b, rotating the first lens group fixing frame 11 for adjustment causes the second lens group fixing frame 12 to rotate together with the first lens group fixing frame 11. Accordingly, in the above illustrated embodiment of the zoom lens barrel, the two outer cam grooves 21 and the two inner cam grooves 22 constitute a cam device for bringing the first lens group fixing frame 11 and the second lens group fixing frame 12 to approach each other outside the zooming range, and the plurality of projecting portions 11b and the plurality of recessed portions 12b constitute a coupling device for mechanically coupling the first lens group fixing frame 11 and the second lens group fixing frame 12 to each other in the direction of rotation thereof when the first lens group fixing frame 11 and the second lens group fixing frame 12 are moved to their respective positions close to each other.

Accordingly, the assembly-stage focus adjustment mechanism that has the above described structure can perform the following assembly-stage focus adjustment operation when the zoom lens barrel 10 is assembled. First of all, the cam ring 20 is rotated to move the two outer cam followers 13b and the two inner cam followers 14b to the assembly-stage focus adjustment position X to thereby bring the first lens group fixing frame 11 and the second lens group fixing frame 12 to their respective positions close to each other. Thereupon, the plurality of projecting portions 11b and the plurality of recessed portions 12b are engaged with each other, so that the first lens group fixing frame 11 and the second lens group fixing frame 12 become integral with each other in the direction of rotation thereof about the optical axis O. In this state in which the first lens group fixing frame 11 and the second lens group fixing frame 12 are integral with each other in the direction of rotation thereof about the optical axis O, rotating the first lens group fixing frame 11 via a jig such as a pin face wrench 23 (see FIG. 1) causes the first lens group fixing frame 11 and the second lens group fixing frame 12 to rotate as one integral body via the engagement of the plurality of projecting portions 11b and the plurality of recessed portions 12b relative to the first lens group moving frame 13 and the second lens group moving frame 14 which are linearly guided in the optical axis direction, i.e., not rotatable about the optical axis O. The first lens group fixing frame 11 and the second lens group fixing frame 12 move along the optical axis O upon being rotated because the male thread 11a of the first lens group fixing frame 11 and the male thread 12a of the second lens group fixing frame 12 are engaged with the female thread 13a of the first lens group moving frame 13 and the female thread 14a of the second lens group moving frame 14, respectively. Accordingly, the assembly-stage focus adjustment operation can be carried out by moving the first lens group L1 and the second lens group L2 forward or rearward in the optical axis direction.

In the above illustrated embodiment, since the thread leads of the male thread 11a and the male thread 12a are the same, the amount of movement of the first lens group L1 in the optical axis direction per unit of rotational angle of the first lens group fixing frame 11 and the amount of movement of the second lens group L2 in the optical axis direction per unit of rotational angle of the second lens group fixing frame 12 are identical to each other. Furthermore, since the focus sensitivities of the first lens group L1 and the second lens group L2 have the same sign (i.e., positive or negative), moving the first lens group L1 and the second lens group L2 together in the optical axis direction makes it possible to reduce the amount of movement thereof necessary for the assembly-stage focus adjustment operation.

Figure 6:
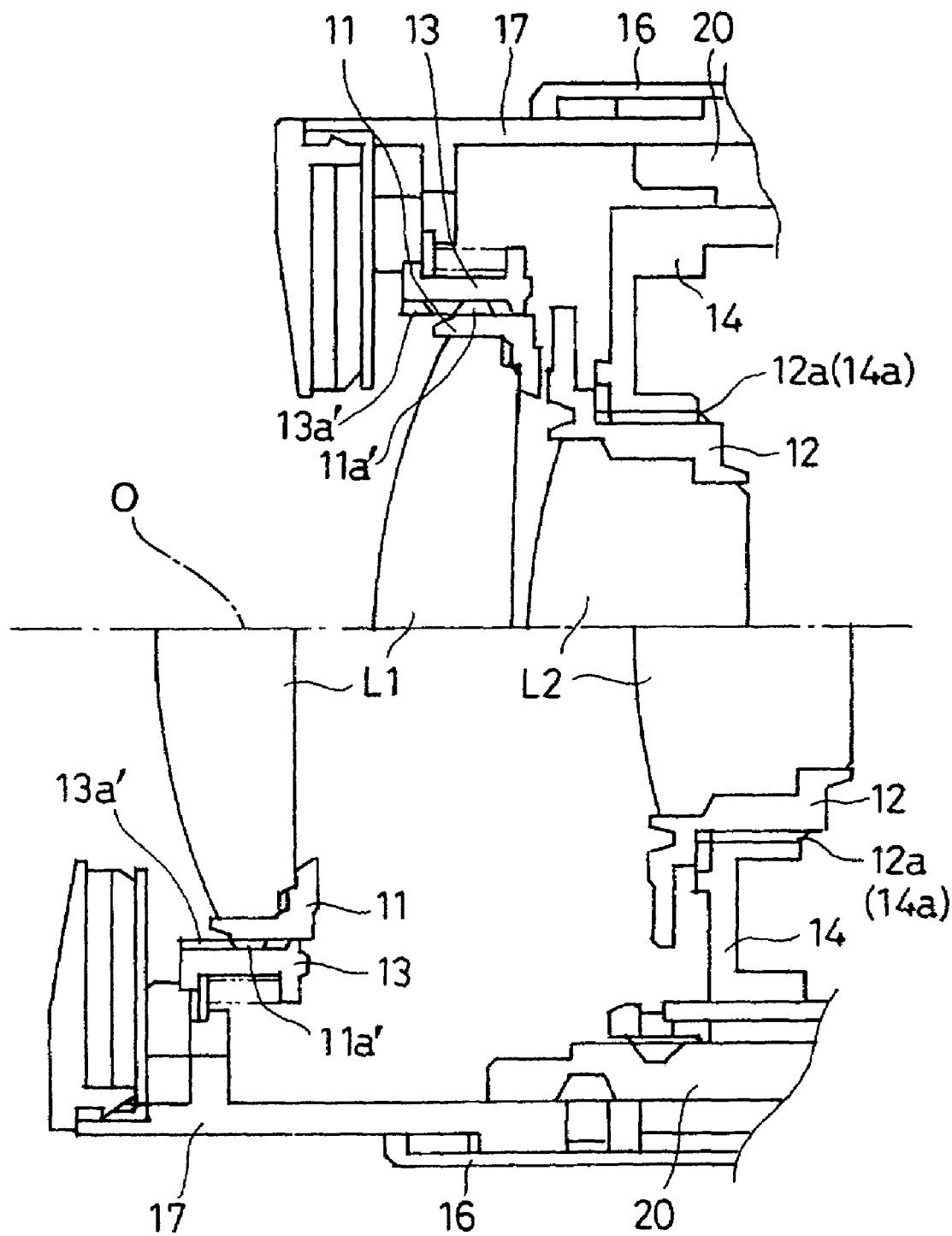
FIG. 6 is a longitudinal cross sectional view of a portion of a zoom lens barrel in which a second embodiment of the assembly-stage focus adjustment mechanism devised according to the present invention is incorporated, showing an upper half and a lower half of the zoom lens barrel from the optical axis thereof at the wide-angle extremity and the telephoto extremity, respectively.
Figure 7:
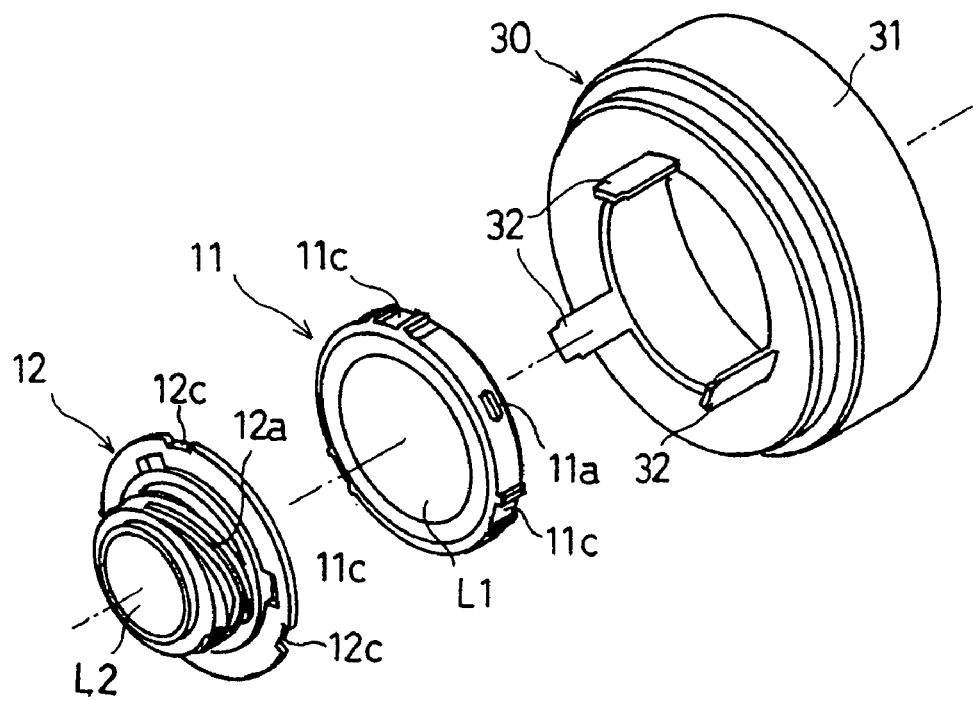
FIG. 7 is an exploded perspective view of a portion of the zoom lens barrel shown in FIG. 6 and a jig specially designed therefor, showing a first lens group fixing frame, a second lens group fixing frame and the jig which are coaxially arranged.
Figure 8:
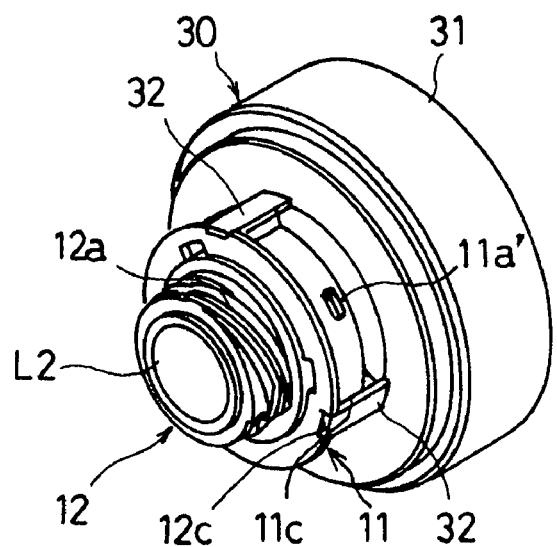
FIG. 8 is a perspective view of the first lens group fixing frame, the second lens group fixing frame and the jig which are shown in FIG. 7 in a combined state.

FIGS. 6 through 8 show a second embodiment of the assembly-stage focus adjustment mechanism according to the present invention. Elements of the second embodiment of the assembly-stage focus adjustment mechanism which are similar (which correspond) to those of the first embodiment of the assembly-stage focus adjustment mechanism are designated by the same reference numerals although they are different in shape. In the second embodiment of the assembly-stage focus adjustment mechanism, the first lens group fixing frame 11 is provided on an outer peripheral surface thereof with a plurality of male projections (corresponding to a male thread) 11a' (only one of them is shown in FIG. 7), and is further provided on an inner peripheral surface of the first lens group moving frame 13 with a plurality of lead grooves 13a' in which the plurality of male projections 11a' are respectively engaged. This engagement of the plurality of male projections 11a' with the plurality of lead grooves 13a' constitutes a screw engagement. The thread lead of the plurality of male projections 11a' (the thread lead of the plurality of lead grooves 13a') and the thread lead of the male thread 12a (the female thread 14a) are the same.

The first lens group fixing frame 11 is provided, on an outer peripheral surface thereof at intervals of 120 degrees, with three association grooves 11c, and the second lens group fixing frame 12 is provided on an outer peripheral surface thereof with three association grooves 12c which correspond to the three association grooves 11c, respectively. In the second embodiment of the assembly-stage focus adjustment mechanism, a jig 30 (see FIGS. 7 and 8) serves as a rotational-direction integrating device which makes the first lens group fixing frame 11 and the second lens group fixing frame 12 rotate together as one integral body. The jig 30 is provided with a ring body 31 and three engaging projections 32 which project from the ring body 31 to correspond to the three association grooves 11c and the three association grooves 12c, respectively. A clearance (not shown) is secured between the outer peripheral surface of the first lens group fixing frame 11 and the inner peripheral surface of the first lens group moving frame 13 to allow the three engaging projections 32 of the jig 30 to be inserted therebetween.

Accordingly, in the second embodiment of the assembly-stage focus adjustment mechanism, the assembly-stage focus adjustment is performed in the following manner. Firstly, the first lens group fixing frame 11 (the first lens group L1) and the second lens group fixing frame 12 (the second lens group L2) are made to move to their respective positions closest to each other, as shown, for example, in the upper half of the zoom lens barrel shown in FIG. 6 where the first lens group fixing frame 11 and the second lens group fixing frame 12 of the zoom lens barrel are positioned at the wide-angle extremity. In this state, the jig 30 is inserted into the aforementioned clearance so that the three engaging projections 32 are engaged in the three association grooves 11c of the first lens group fixing frame 11 and the three association grooves 12c of the second lens group fixing frame 12 at the same time, respectively, to integrate the first lens group fixing frame 11 and the second lens group fixing frame 12 with each other in the direction of rotation thereof (see FIG. 8). In this state, rotating the jig 30 causes the first lens group fixing frame 11 and the second lens group fixing frame 12 to rotate as one integral body relative to the first lens group moving frame 13 and the second lens group moving frame 14 which are linearly guided in the optical axis direction, i.e., not rotatable about the optical axis O. Accordingly, the assembly-stage focus adjustment operation can be carried out similar to the first embodiment of the assembly-stage focus adjustment mechanism.

After completion of the assembly-stage focus adjustment operation, the first lens group fixing frame 11 and the second lens group fixing frame 12 are fixed to the first lens group moving frame 13 and the second lens group moving frame 14, respectively, by a known fixing device such as an adhesive.

Although each of the above described embodiments of the assembly-stage focus adjustment mechanisms are applied to a zoom lens barrel having a zoom lens optical system consisting of four lens groups, the present invention can also be applied to a common zoom lens barrel having a zoom lens optical system consisting of more than two movable lens groups which are moved to vary focal length.

Although the first lens group fixing frame 11 and the second lens group fixing frame 12 are screw-engaged with the first lens group moving frame 13 and the second lens group moving frame 14 with the same thread leads, respectively, it is possible for the thread leads of the plurality of male projections 11a' and the thread lead of the plurality of lead grooves 13a' be different from the thread leads of the male thread 12a and the female thread 14a.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An assembly-stage focus adjustment mechanism of a zoom lens barrel including a plurality of lens groups which are moved while distances therebetween are changed to perform a zooming operation, said assembly-stage focus adjustment mechanism comprising:
   two lens fixing frames to which two of said plurality of lens groups are fixed, respectively;
   two moving frames which linearly move in an optical axis direction during said zooming operation, said two moving frames being respectively screw-engaged with said two lens fixing frames; and
   a rotational-direction integrating device which makes said two lens fixing frames rotate as one integral body in a direction of rotation relative to said two moving frames when an assembly-stage focus adjustment operation is performed.

2. The assembly-stage focus adjustment mechanism according to claim 1, wherein said plurality of lens groups comprises a first lens group, a second lens group, a third lens group and a fourth lens group which are arranged in that order from an object side, said first lens group and said second lens group constituting said two of said plurality of lens groups.

3. The assembly-stage focus adjustment mechanism according to claim 1, wherein said rotational-direction integrating device comprises:
   a cam device for bringing said two moving frames to approach each other outside a zooming range; and
   a coupling device for mechanically coupling said two fixing frames to each other in said direction of rotation when said two moving frames are moved to respective positions thereof close to each other.

4. The assembly-stage focus adjustment mechanism according to claim 1, wherein said rotational-direction integrating device comprises a jig which mechanically connects said two lens fixing frames to each other in said rotational direction.

5. The assembly-stage focus adjustment mechanism according to claim 4, wherein said two lens fixing frames are mechanically connected to each other by said jig when said zoom lens barrel is set at wide-angle extremity.

6. The assembly-stage focus adjustment mechanism according to claim 5, wherein said two lens fixing frames are screw-engaged with said two moving frames with the same thread leads, respectively.

7. The assembly-stage focus adjustment mechanism according to claim 1, wherein focus sensitivities of said two of said plurality of lens groups have the same sign.

8. The assembly-stage focus adjustment mechanism according to claim 3, wherein said cam device comprises outer cam grooves and inner cam grooves which are formed on an outer peripheral surface and an inner peripheral surface of a cam ring, respectively.

9. The assembly-stage focus adjustment mechanism according to claim 4, wherein said jig is accessible to said two lens fixing frames from a front end of said zoom lens barrel.

10. The assembly-stage focus adjustment mechanism according to claim 3, wherein said coupling device comprises a plurality of projecting portions and a plurality of recessed portions which are respectively formed on surfaces of said two lens fixing frames that are opposed to each other in said optical axis direction.

11. A zoom lens barrel including at least three movable lens groups which are moved along an optical axis to perform a zooming operation, said zoom lens barrel comprising:
   two lens holders to which two of said three movable lens groups are fixed, respectively;
   two moving frames which linearly move in an optical axis direction without rotating during said zooming operation, said two moving frames being respectively screw-engaged with said two lens holders; and
   a rotational-direction integrating device which makes said two lens holders rotate as one integral body in a direction of rotation relative to said two moving frames when an assembly-stage focus adjustment operation is performed.

* * * * *